UNITED STATES PATENT OFFICE.

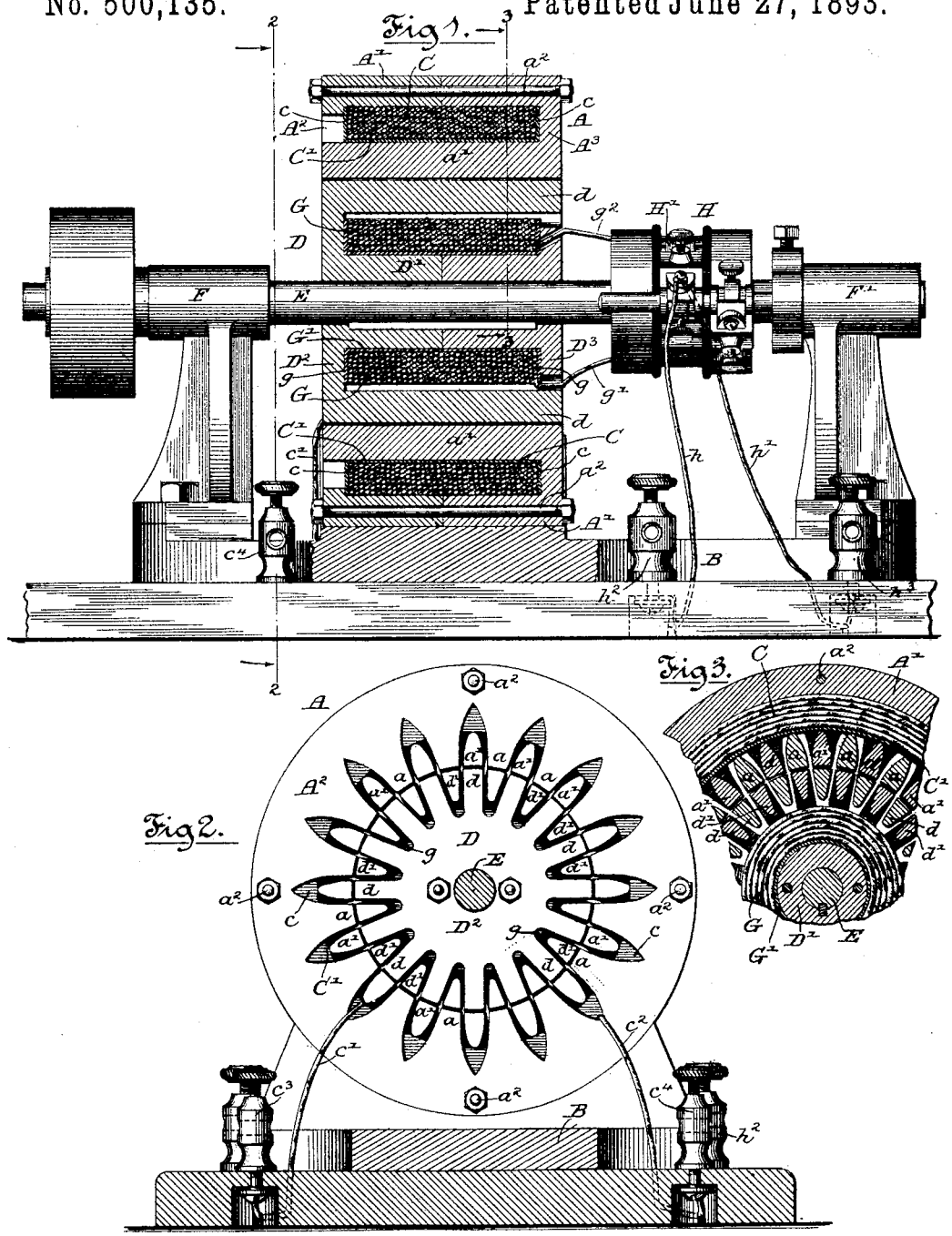

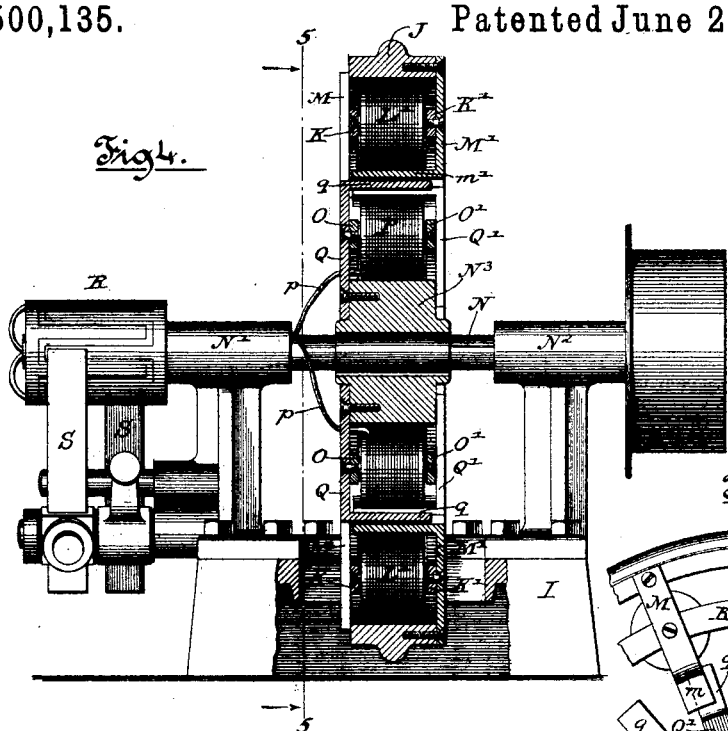# 
(No Model.) 2 Sheets—Sheet 2.
C. S. JONES, Dec'd.
S. H. JONES, Executrix.
ELECTRIC MOTOR.
No. 500,135. Patented June 27, 1893.
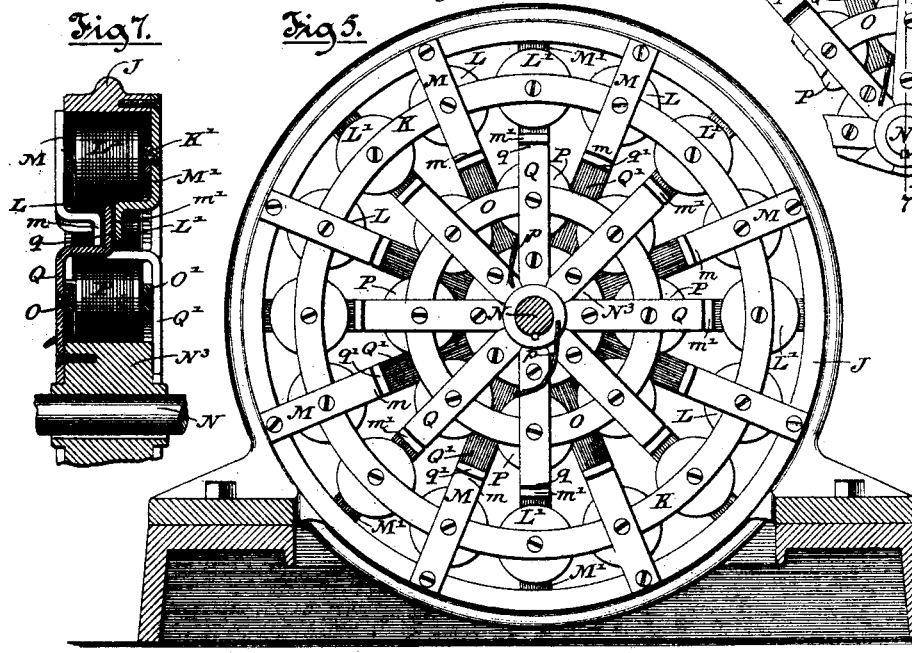
Witnesses
Wm. F. Henning
Louis M. F. Whitehead
Inventor
Charles S. Jones
by Dayton, Poole & Brown
Attorneys

CHARLES S. JONES, OF CHICAGO, ILLINOIS; SUSAN H. JONES EXECUTRIX OF SAID CHARLES S. JONES, DECEASED.

ELECTRIC MOTOR.

SPECIFICATION forming part of Letters Patent No. 500,135, dated June 27, 1893.

Application filed April 7, 1890. Serial No. 346,805. (No model.)

*To all whom it may concern:*

Be it known that I, CHARLES S. JONES, of Chicago, in the county of Cook and State of Illinois, have invented certain new and useful Improvements in Electric Motors; and I do hereby declare that the following is a full, clear, and exact description thereof, reference being had to the accompanying drawings, and to the letters of reference marked thereon, which form a part of this specification.

This invention relates to an improvement in electric motors of that class consisting of a field magnet or magnets provided with a plurality of polar projections or pole pieces and a revolving armature having corresponding pole pieces or polar faces operating in connection therewith.

The invention consists in the matters hereinafter described and set forth in the appended claims.

In the accompanying drawings illustrating my invention: Figure 1 is a central, longitudinal section of a motor embodying my invention. Fig. 2 is a sectional elevation of the same taken upon line 2—2 of Fig. 1. Fig. 3 is a detail section taken upon line 3—3 of Fig. 1. Fig. 4 is a vertical, longitudinal section of another form of motor embodying my invention. Fig. 5 is a sectional elevation of the same taken upon line 5—5 of Fig. 4. Fig. 6 is a fragmentary side view of a motor differing somewhat from that shown in Figs. 4 and 5. Fig. 7 is a sectional view taken upon line 7—7 of Fig. 6.

As shown in Figs. 1, 2 and 3, A indicates as a whole an annular field magnet herein shown as supported upon a flat base B with its central, axial line arranged horizontally. Said cylindric field magnet consists in its main or essential parts of an outer cylindric portion A' having inwardly extending end walls or flanges $A^2 A^3$, and a series of parallel annularly arranged bars or pole-pieces $a\, a\, a$, $a'\, a'\, a'$ located inside of and at some distance inwardly from the exterior cylinder A', one set $a\, a\, a$ of said bars or pole-pieces being attached to the flange $A^2$ and the other set $a'\, a'\, a'$ of pole-pieces being attached to the other flange $A^3$. The bars or pole-pieces $a\, a\, a$ are separated from the pole-pieces $a'\, a'\, a'$, or in other words, air-spaces are left between the two sets of pole-pieces so that they are magnetically separated from each other. It will of course be understood that said bars or pole-pieces may be connected, if desired, by means of brass or other non-magnetic material without affecting the operation of the machine, the separation referred to being for the purpose of obtaining magnetic insulation between the two sets of pole-pieces.

As far as the mechanical construction of the field magnets is concerned, they may in practice be made or built up in any desired or preferred manner. In the particular construction illustrated the outer cylindric part A' of the magnet is divided centrally into two parts or halves, the bars or pole-pieces $a\, a\, a$ being cast integral with the flange $A^2$ upon one of the parts or halves, and the bars or pole-pieces $a'\, a'\, a'$ being cast integral with the flange $A^3$ of the other half. The parts are conveniently joined by bolts $a^2\, a^2$ in the manner illustrated.

C is the exciting coil of the field magnet, said coil being placed in the annular opening or space formed between the outer cylindric part A' of the field magnet and the bars or pole-pieces $a\, a\, a, a'\, a'\, a'$ thereof. Said field-magnet coil C is herein shown as arranged to nearly fill said annular space, a cylindric shell C' having flanges $c\, c$ being placed around the said bars or pole pieces so as to immediately sustain and hold in place the wires composing the coils, in the manner illustrated in the drawings.

In the construction of a field magnet of the character described, when the same is made in two parts as herein shown, the coil C will first be made complete and the two parts of the field magnet will then be placed together, with the coil within the recess between them, and secured by the bolts $a^2\, a^2$ in an obvious manner.

$c'\, c^2$ illustrate the terminals of the field magnet coil which lead to binding posts $c^3\, c^4$.

In the passage of an exciting current or electric impulses through the field magnet coil, north and south poles will be developed at the opposite ends of the cylindric magnet A and all of the bars or poles, as $a\, a\, a$, which are connected with that end of the cylindric field magnet exhibiting north polarity will exhibit the same polarity while the other intermediate pole pieces or bars $a'\ a'\ a'$ connected with the south end of the field magnet will be of south polarity. It follows that said several bars or pole pieces $a'\ a'\ a'$ will be of alternate north and south polarity throughout the entire circumference of the field-magnet.

D indicates, as a whole, the armature core, which is generally of cylindric form, and secured upon a shaft E which has bearings F F' upon the base B and is arranged with its longitudinal axis co-incident with the central axis of the cylindric field-magnet. The armature D consists in its essential parts of a central, cylindric hub D' having at its opposite ends outwardly extending flanges $D^2\ D^3$ to which are connected two sets of parallel pole-pieces or bars $d\ d\ d,\ d'\ d'\ d'$ arranged annularly and in alternation, in the same manner as hereinbefore described in connection with the similar pole-pieces of the field magnet. The armature core is conveniently made in two parts or halves each carrying one set of pole-pieces; the armature core in this respect being like the field-magnet core.

G indicates the exciting coil of the armature, the same being located within the annular space between the hub D' and the bars or pole-pieces $d\ d\ d,\ d'\ d'\ d'$ of the armature.

G' indicates a cylindric shell having flanges $g\ g$ upon which the wire is wound to form the coil, so that the same may be conveniently placed between the two parts of the armature core, in constructing the armature.

$g'\ g^2$ indicate terminals of the armature coil G, which terminals are connected with a commutator H on the shaft E.

$h\ h'$ are wires leading from the brushes H' $H^2$ of the commutator to binding posts $h^2\ h^3$. Said commutator operates in a well known manner to regularly reverse the current which traverses the coils of the armature so that each set of pole-pieces or bars of said armature will become alternately of north and south polarity, the pole-pieces of the field magnet maintaining always the same polarity in case the current by which the machine is driven is a continuous or non-alternating current.

As far as the general operation of the machine is concerned, it is the same as the other machines having a plurality of annularly arranged polar faces on the field magnet and armature, such for instance as the early form of motor known as Jacobi's, the current which traverses the rotating armature being regularly reversed at the moment the polar faces of the armature pass the poles of the field magnet, thereby maintaining a continuous rotation of the armature as long as the current continues. The motor described differs from the other motors, however, in having the pole pieces which are connected with opposite poles of the field magnet and armature arranged in alternation on both the field magnets and armatures, so that whenever a pole piece of the armature comes opposite a pole piece of the field magnet of corresponding polarity, the adjacent pole-piece of the armature of opposite polarity will be opposite a pole-piece of the field magnet of such opposite polarity so that a closed magnetic circuit is formed through each pair of adjacent pole-pieces of the armature and field magnet as many times during each revolution of the armature as there are pole-pieces on the armature or field magnet.

To more fully set forth this feature of the operation of the machine, assuming that one of the field magnet pole-pieces $a'$ is of south polarity and the adjacent one is of north polarity, as shown in the drawings, Figs. 1 and 2, when one of the pole-pieces $d$ of the armature which is of south polarity is opposite said pole-piece $a'$ and an adjacent pole-piece $d'$, which is of south polarity is opposite said pole-piece $a$, then a closed magnetic circuit interrupted only by the narrow air space between the said polar faces may be traced through the main part of the field magnet, the pole-piece $a$, the pole-piece $d'$, the main part of the armature core, the pole-piece $d$ and the pole-piece $a'$. It is of course understood that the position of the parts above described and shown in the drawings is that which they will occupy at the moment before the reversal of the current through the armature coil and that as soon as the current is reversed the opposing pole-pieces, at $a'$ and $d$, will become of opposite polarity and will therefore repel each other while each pole-piece of the armature will be attracted toward the next adjacent pole-piece of the field magnet in advance of it, thereby producing the rotary motion of the armature.

An advantage is gained by the construction described in the armature core and field magnet, for the reason that a stronger attractive force is exerted when the air-space through which the magnetic circuit is completed is small or narrow, and such magnetic circuit is made or completed in or through magnetic material, than when the air space is wide and the magnetic circuit, or so-called field of force, extends through a mass of non-magnetic material such as the copper armature coils of some forms of electric generators and motors.

An advantage obtained by arranging in alternation opposite pole-pieces of the same field-magnet or armature is that a large number of impulses are thereby given to the revolving part of the motor during each rotation thereof, the number of impulses during each revolution being equal to the entire number of pole-pieces on the field-magnet.

I have found that a motor constructed as shown in the drawings and as above described, will operate with either a continuous or alternating current, there being no appreciable difference in the result or work accomplished by the motor in using an alternating current from that produced by using a continuous current of the same strength. It is of course understood that in using an alternating current, the magnetism in the pole-pieces of the field magnet is being continuously reversed or alternated at a rate corresponding with the alternations of the current supplied to the machine, but the commutator is found to maintain the proper relation between the polarity of the armature and field magnet pole-pieces without regard to the alternations of such current supplied to the motor and independently of the reversals in the alternating current. In other words, the alternations produced by the armature of the machine need not be synchronous with those of the generator but are entirely independent thereof, the motor running at its normal speed whether the alternations produced by the generator are fast or slow.

A machine embracing the same features of construction as above set forth may obviously be used as an electric generator as well as a motor, it of course being seen that if power be applied to give motion to the revolving armature, the current will be generated in the same manner as in other similar machines. When the machine is used as a generator, the novel features of construction herein described will operate to the same advantage as when used as a motor; the completion of a magnetic circuit through adjacent pole-pieces or bars of the field-magnet and armature in such case operating to produce a stronger magnetic field than is present in a construction in which the magnetic circuit is completed through a wide air-space, or through a thick body of non-magnetic material.

In Figs. 4 and 5 I have shown a machine embracing the same features of construction hereinbefore set forth, but in which a plurality of field magnet and armature coils are employed. As shown in said figures, I indicates a base to which is secured a metal ring J, usually of non-magnetic material. K K' are two rings of magnetic metal located within the ring J and having between them a series of spool-magnets L L L, L' L' L'. The ring K is sustained from the outer ring J by means of a series of radial bars M M M, while the ring K' is similarly sustained by the radial bars M' M'. The bars M M are arranged opposite the cores of the alternate magnets L conveniently by means of screws entering the ends of the cores, as shown in the drawings. The bars M' M' are similarly arranged opposite the exterior magnets L' L' and are secured to the ring K' and to the cores of said magnets L'. All of the said magnets L' L' have their cores wound in the same direction so as to develop corresponding poles at the same sides of the machine, or in other words, the ends of all magnet cores in contact with the ring K are of one polarity and all of the ends of the cores in contact with the other ring K' are of the other polarity, so that said rings K K' and the radial bars M M' connected therewith are of opposite polarity. The inner ends of the several bars M are bent inwardly at right angles to said bars and parallel with the cores of the magnets, while the inner ends of the several bars M' are similarly bent inward, the said bent ends of the arms M M' forming a series of pole-pieces $m$ $m'$ arranged in annular order and of alternating and opposite polarity. N is a shaft mounted in bearings N' N² of the base I. Said shaft carries a hub N³ preferably of non-magnetic metal. O O' are two rings of magnetic metal arranged exterior to the hub N³ and P P P are spool-magnets located between said rings with their central axes parallel with that of the shaft. Q Q Q are radial bars attached to the hub N³ and to the ring O, said bars being arranged opposite the magnets P P P and secured to the cores of the latter as well as to said ring O. The several magnets P P P and parts supporting the same from the shaft constitute the revolving part or armature of the motor, the magnets P P P being, in the construction shown, only one-half as numerous as the stationary or field magnets. The outer ends of the several bars Q Q are bent at right angles and are parallel with the axis of the coils P, thereby forming pole-pieces $q$ and the ends of the bars Q' are similarly bent to form pole-pieces $q'$ which are arranged in annular relation with the pole-pieces $q$ $q$, both sets of pole-pieces being arranged to pass in close proximity to the pole-pieces $m$ $m$ $m$, $m'$ $m'$ $m'$ of the field magnets. The coils of the several magnets P P P are so wound as to produce similar poles at the same side of the machine, so that the ring O is of one polarity and the ring O' of the opposite polarity. It follows that all of the pole-pieces $q$ $q$ $q$ will have the same polarity as the ring O, while all the pole-pieces $q'$ $q'$ $q'$ will have the same polarity as the ring O'. The terminals of the several magnet coils, which are connected in series, are indicated at $p$ $p$ $p$, said terminals extending to the commutator R upon the shaft N. Said commutator operates in connection with brushes S S S to produce reversals in the current passing through the several coils P P P in the same manner heretofore common in similar machines. The field-magnet coils L L L, L' L' L' are also arranged in series and in circuit with the generator.

When the several pole-pieces of the armature and field magnets are opposite each other, the same effect is obtained as in the construction shown in Figs. 1, 2 and 3, that is to say, supposing the pole-piece $q'$ is opposite the pole-piece $m$ and both are of the same polarity, a magnetic circuit will be completed through the said pole-piece $m$ and bar M, the core of the magnet L, the ring K', the bar M', the pole-piece $m'$, the radial bar Q, the core of the magnet P, the ring O' and the bar Q'. Upon a reversal of the current in the armature magnets, as the several movable pole-pieces $q$ $q$ $q'$ $q'$ are passing the stationary pole-pieces, the movable pole-pieces will be repelled by those which they are passing and attracted by the next adjacent pole-pieces in advance of the same and the armature will thus be caused to rotate in the same manner as before described.

It will of course be understood that several magnet coils in a machine like that shown in Figs. 4 and 5 may be connected otherwise than in series and that said machine may be used as a generator instead of as a motor.

While the arrangement of the pole-pieces belonging to both the stationary and movable parts of the machine in annular relation is a simple and convenient one, yet this particular construction is not essential for carrying out the principal features of my invention. As for instance, the modification of the construction illustrated in Fig. 5 may be employed, which is shown in Figs. 6 and 7, wherein all of the movable pole-pieces $q\ q\ q'\ q'$ are arranged in annular order while the stationary pole-pieces $m\ m\ m$ are arranged annularly at one side of the path of the pole-pieces $q\ q'$, while the opposite pole-pieces $m'\ m'\ m'$ are arranged at the opposite side of said path of the movable pole-pieces.

It will of course be seen, from the construction shown in Figs. 6 and 7, that the general result is the same as that obtained by the construction illustrated in other figures of the drawings, that is to say, the magnetic circuits are closed through adjacent pole-pieces connected with the opposite poles of the magnet.

I do not claim as part of my invention the specific feature of construction illustrated in the accompanying drawings and embracing, in connection with an armature, and a field magnet consisting of a single coil of wire surrounding an iron core, two sets of pole-pieces, one set connected with each end of the iron-core, the pole-pieces of each end extending across the head and side of the coil and standing in alternate planes around the same, and the working faces of the said pole pieces being substantially parallel with the axis of the coil, inasmuch as this construction is shown and claimed in Letters Patent No. 450,219, granted to W. F. Collins April 14, 1891.

I claim as my invention—

1. An electric generator or motor, comprising a field and armature magnet or magnets, the coils of which are arranged with their axes parallel with the axis of rotation of the moving part of the machine, and having a core or cores provided with a plurality of pole-pieces arranged annularly with the pole-pieces of north polarity alternating with those of south polarity, the said pole pieces of the field and armature magnets being equal in number, and arranged at equal angular distances apart, substantially as described.

2. An electric generator or motor comprising field and armature magnets each consisting of a cylindric core, having a plurality of pole-pieces arranged annularly with the pole-pieces of north polarity alternating with those of south polarity, and a coil located adjacent to the said cylindric core, substantially as described.

In testimony that I claim the foregoing as my invention I affix my signature in presence of two witnesses.

CHARLES S. JONES.

Witnesses:
C. CLARENCE POOLE,
GEORGE W. HIGGINS, Jr.